United States Patent

[11] 3,620,207

| [72] | Inventor | John C. Sinclair<br>Storm Lake, Iowa |
|---|---|---|
| [21] | Appl. No | 824,518 |
| [22] | Filed | May 14, 1969 |
| [45] | Patented | Nov. 16, 1971 |
| [73] | Assignee | Iowa State University Research Foundation, Inc.<br>Ames, Iowa |

[54] BLOOD FLOWMETER
10 Claims, 7 Drawing Figs.

[52] U.S. Cl. .................................... 128/2.05 F, 73/204
[51] Int. Cl. .................................... A61b 5/02
[50] Field of Search .......................... 128/2.05 D, 2.05 F, 2.05 R, 2 B, 2 R, 214, 348, 349; 73/204

[56] References Cited
UNITED STATES PATENTS

| 3,074,396 | 1/1963 | MacLean | 128/2 B |
| 3,347,224 | 10/1967 | Adams | 128/2.05 F |
| 3,359,974 | 12/1967 | Khalil | 128/2.05 F |
| 3,405,708 | 10/1968 | Webster, Jr. | 128/2.05 F |
| 3,446,073 | 5/1969 | Auphan et al. | 128/2.05 F |

Primary Examiner—William E. Kamm
Attorney—Henderson & Strom

ABSTRACT: This invention relates to a blood flowmeter comprising a catheter suitable for insertion into a blood vessel, thermal resistors (thermistors) connected in electrical circuits disposed in the catheter near the insertable end of the catheter, and moving means for moving the thermistors out of the insertable end of the catheter into the blood flow and, when desired, back into the catheter. Means are also provided for measuring electrical response through the thermistors. Flow characteristics in the blood vessels are determined by observing changes in measured electrical response through the thermistor circuits.

PATENTED NOV 16 1971

3,620,207

INVENTOR
JOHN C. SINCLAIR
BY
Henderson & Strom
ATTORNEYS

BLOOD FLOWMETER

BACKGROUND OF THE INVENTION

This invention relates to a blood flowmeter, a portion of which is insertable into mammalian blood vessels. The flow meter can be utilized to determine blood flow velocity, diameter of the vessel lumen and the presence of constrictions or enlargements of the vessel lumen.

Several methods of determining blood flow characteristics have been utilized in the past. Radio opaque materials have been injected into the bloodstream and the dissemination of this material through the blood vessels followed with appropriate instruments. Readings over a long period, however, cannot be readily obtained. Additionally, injection of radio opaque materials into the bloodstream can cause arterial spasms and strokes.

Differential pressure readings and the cyclic movement of various foreign substances injected into the bloodstream have also been utilized to determine blood flow relationships. The former method cannot be utilized to determine the presence of restrictions or enlargements in the vessel lumen and, false readings of blood flow characteristics may be obtained. In the latter method, foreign materials must be permanently injected into the blood with concomitant dangers.

Electromagnetic and ultrasonic flowmeters have been used with some success to determine blood flow velocity. However, these flowmeters have not been refined sufficiently to determine the cross sectional area of the vessel lumen nor the presence of restrictions or enlargements in the vessel lumen.

SUMMARY OF THE INVENTION

This invention relates to a flowmeter for measuring fluid flow characteristics in small tubes comprising an elongate, flexible catheter having a cross-sectional area of less than about one-fifth that of the tube; at least two electrically conductive, insulated wires extending longitudinally through the catheter and movable longitudinally therein; at least one thermistor which is electrically insulated, disposed near the insertable end of the catheter, and electrically connected between the ends of two wires; moving means connected to the wires to move the wires longitudinally in the catheter; and connecting means for connecting the free ends of the wires to an instrument capable of measuring the electrical response through the thermistors. This flowmeter is specially designed to measure blood flow characteristics in the vascular system.

The primary object of this invention is to provide a flowmeter which can be utilized to accurately measure the fluid velocity and the fluid volume flow in an enclosed tube.

Another object is to provide a flowmeter suitable for insertion into the vascular system of mammals which can accurately measure the flow characteristics of blood.

A further object of this invention is to provide a blood flowmeter for measuring blood flow characteristics in the vascular system which does not require introduction of potentially harmful chemicals into the blood.

A still further object of this invention is to provide a blood flowmeter which can be utilized to indicate the presence of restrictions and enlargements in the vessel lumen and the location of the restrictions and/or enlargements.

Yet another object is to provide a blood flowmeter which has a readily determined, and readable zero point or point of no flow.

Still another object is to provide a blood flowmeter which is innocuous to human tissue and which has means for centering the catheter in the blood vessel mounted on the insertable end of the catheter.

DESCRIPTION OF THE PREFERRED EMBODIMENTS

Figure 1:
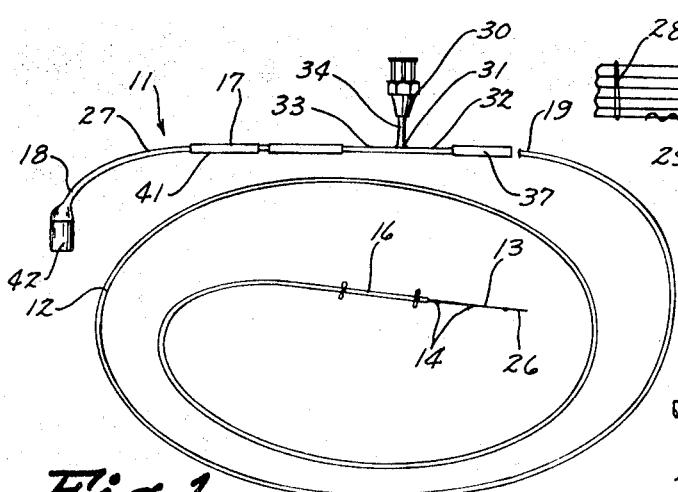
FIG. 1 is a broken perspective view of the flowmeter of this invention wherein the catheter is enlarged and the moving means and connecting means are reduced in size.
Figure 2:
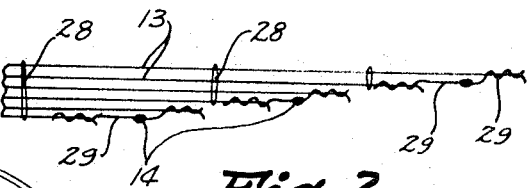
FIG. 2 is a schematic of the electrical connection between the thermistors and the wires near the insertable end of the catheter.

Referring now to the drawings, the flowmeter of this invention is indicated generally at 11 in FIG. 1. The flowmeter 11 is comprised of a catheter 12, wires 13 extending longitudinally through the catheter 12, and at least one thermistor 14 electrically connected between the wires 13 and disposed near the insertable end 16 of the catheter 12. Moving means 17 are connected to the wires 13 for longitudinally moving the thermistors 14 into and out of the insertable end 16 of the catheter 12. Connecting means 18 electrically connects the wires 13 proximate the measurement end 19 of the catheter 12 to an instrument (not shown) capable of measuring the electrical response through the thermistors 14.

More specifically, the catheter 12 (FIG. 1) is elongate and flexible and has two ends, an insertable end 16 and a measurement end 19, and has a passageway 21 (FIG. 4) formed therethrough. The catheter 12, at least on the insertable end 16, has a cross-sectional area of less than about one-fifth of the cross-sectional area of the inside of the tube or blood vessel (not shown) in which the catheter 12 is inserted. Preferably the cross-sectional area of the catheter 12 is less than about one-tenth of the cross-sectional area of the inside of the blood vessel to, thereby, minimize disturbance of the normal blood flow characteristics in the blood vessel.

Figure 4:
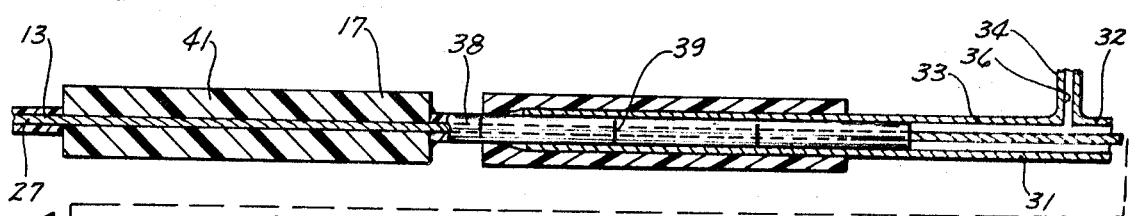
FIG. 4 is a magnified and broken side view of the moving means and the insertable end of the catheter wherein the thermistors have been moved out of the insertable end of the catheter.

On the insertable end 16 of the catheter 12, centering means 22 (FIG. 4) are formed to center the catheter 12 in the blood vessel. The centering means 22 shown in FIG. 4 is comprised of silk threads 23 tied in loops around the catheter 12 and coated with a mixture of silicone rubber and toluene. Toluene, or a similar dilutant, is utilized to reduce the viscosity of the silicone rubber and, thereby, obtain a thin, uniform coating of silicone rubber on the silk threads 23. Other materials can be substituted for the materials above described and similar results will be obtained. This centering means 22 is preferred for use, especially in the arteries, because it will flex with the pulsating of the arterial walls and, thereby, minimize dangers of puncturing the vessel lumen.

Other devices for centering the catheter 12 can, of course, be used herein. The centering means 22 must, however, be flexible and innocuous to mammalian tissue.

Figure 5:
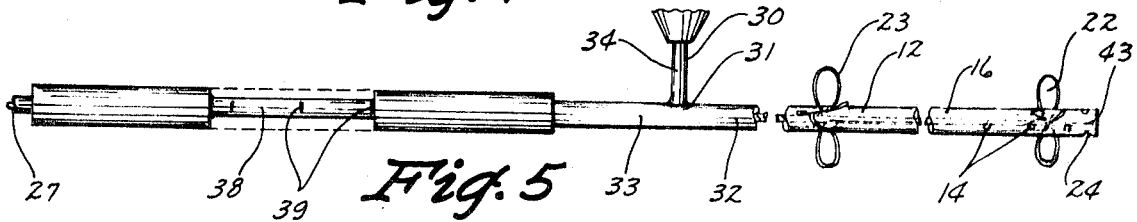
FIG. 5 is a magnified and broken side view of the moving means and the insertable end of the catheter wherein the thermistors have been moved into the insertable end of the catheter.
Figure 6:
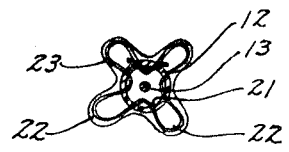
FIG. 6 is a greatly magnified end view of the insertable end of the catheter.

A plurality of holes 24 (FIGS. 4 and 5) are formed through the walls of the insertable end 16 of the catheter 12. These holes 24 are utilized to create turbulence in the blood vessel upon introduction of liquids into the blood vessel through the catheter 12. As explained in more detail hereinafter, complete mixing of liquids introduced through the catheter 12 and the blood must be achieved to accurately determine the cross-sectional area of the blood vessels with this blood flowmeter 11. The creation of turbulent flow in the blood vessel helps to achieve complete mixing.

At least two wires 13 extend longitudinally through the passageway 21 in the catheter 12 and are movable longitudinally therein. Each of the wires 13 is electrically insulated and electrically conductive and has two ends 26 and 27 (FIG. 1). One end 26 is disposed proximate the insertable end 16 of the catheter 12 while the other end 27 is disposed proximate the measurement end 19 of the catheter 12.

Generally, and preferably, a plurality of wires 13 are used herein. Two wires 13 are utilized for each thermistor 14 and, preferably, three thermistors 14 are utilized herein. The wires are preferably formed from platinum alloy and are drawn to a diameter of about 0.0025 inches. Platinum alloy wires 13 are used herein because they are strong, very flexible, commercially available and, of course, excellent conductors of electricity.

The wires 13 are wound in pairs to add rigidity thereto and then the paired wires 13 are wound with each other (FIG. 3) and tied with threads 28 to add strength to the wires 13. The wires 13 generally fill only a minor portion of the passageway 21 through the catheter 12 thereby allowing liquids to flow through the passageway 21.

At least one thermistor 14 is electrically connected, usually by soldering the leads 29 to the ends 26 of two wires 13, electrically insulated, and disposed near the insertable end 16 of the catheter 12. The thermistors 14 are generally insulated by coating them with silicone rubber diluted with toluene or the like. Of course, other insulating media may be used herein.

The thermistors 14 used herein are thermal resistors and have resistances which vary rapidly with slight changes in ambient temperature. These thermistors 14 have a negative coefficient of resistance and, therefore, the resistance rises rapidly with a drop in ambient temperature.

The thermistors 14 are generally of about the same diameter as the wires 13 and have a time constant of 100 Hz. or more. The time constant is a function of the ratio of surface area of the thermistor 14 to its volume and should be as short as possible to obtain accurate data on flow characteristics.

One example of a commercially available thermistor 14 which meets these requirements is the Veco Micro-Bead No. 42A402C, Victory Engineering Corp., Springfield, N.J.

Figure 3:
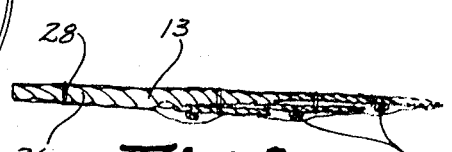
FIG. 3 is a magnified view of the tip of the blood flowmeter which is inserted into the flowing blood.

The thermistors 14 are disposed in spaced apart relation proximate the insertable end 16 of the catheter 12. The distance between the thermistors 14 is carefully controlled and measured to insure accuracy of results. As shown in FIG. 3, three thermistors 14 are utilized with six wires 13.

Means 30 is provided for introducing a liquid through the catheter 12 and into the blood vessel. This means 30 (FIGS. 1 and 5) comprises a T-shaped fitting 31 having two arms 32 and 33 and a leg 34 with interconnecting passageways 36 formed therethrough.

One of said arms 32 (FIG. 1) frictionally receives the measurement end 19 of the catheter 12. A portion of a larger catheter 37 is placed around arm 32 and the measurement end 19 of the catheter 12 to prevent leakage.

The second arm 33 (FIG. 4) is aligned with arm 32 and is adapted to receive and, therefore, attach a portion of the moving means 17. The wires 13 pass through the passageways 36 in the arms 32 and 33 and through moving means 17.

The leg 34 is utilized as means for introducing liquid into the catheter 12. Liquids can be injected through the leg 34 with a hypodermic needle or the like. More sophisticated apparatus, known in the art, can be utilized to obtain a constant injection rate.

Moving means 17 is attached to the T-shaped fitting 31. The moving means 17 comprises a tubular element 38 which is movable in the second arm 33. The tubular element 38 has a series of annular gradations 39 formed thereon and is rigidly affixed to the wires 13. The tubular element 38 can, therefore, be moved inwardly toward the T-shaped fitting 31 and the thermistors 14 will be moved longitudinally out of the insertable end 16 of the catheter 12.

The thermistors 14 can be retracted into the catheter 12 by pulling the tubular element 38 outwardly of the second arm 33. A seal (not shown) prevents liquid from flowing out of the moving means 16 through the tubular element 38.

A handle member 41 (FIG. 5) is generally affixed to the tubular element 38 to facilitate moving the tubular element 38 inwardly and outwardly in the second arm 33.

The wires 13 pass through the moving means 17 and are attached to a Jones plug 42 or the like. The Jones plug 42 is then attached to an oscilloscope, Gras polygraph, Galvinometer, or the like (not shown) to facilitate reading and measuring the electrical response through the thermistors 14.

All metal parts of this flowmeter 11 are preferably manufactured from stainless steel except the platinum alloy wires 13. All other portions of the flowmeter 11 are manufactured from materials innocuous to mammalian tissue.

OPERATION

To utilize the flowmeter 11 of this invention, the insertable end 16 of the catheter 12, with the thermistors 14 retracted inside the catheter 12, is inserted into a blood vessel, generally an artery, with an arterial hypodermic needle. The cross-sectional area of the catheter 12 should be sufficiently small to only minimally disturb the blood flow characteristics. The centering means 22 centers the catheter 12 in the middle of the vessel and retains it in that position.

Power is supplied through the various circuits to the thermistor 14 by utilizing a conventional battery in combination with a wheatstone bridge having two constant resistors (not shown), a variable resistor (not shown) and the thermistor 14 used herein. The current is generally and preferably on the order of $10^{16}$.

Heparized saline solution may be introduced, at intervals, through the liquid introducing means 30 to prevent blood clotting on the thermistors 14. When injection is stopped, the saline solution in the insertable end 16 of the catheter 12 rapidly reaches the same temperature as the blood surrounding it. Therefore, a zero reading under no flow or steady state conditions can be taken with the thermistors 14 inside the catheter 12.

To determine liquid velocity, voltage response is read with current flowing through one thermistor 14 while that thermistor 14 is inside the catheter 12. The thermistor 14 is then pushed out of the catheter 12 into the flowing blood. The moving blood dissipates the heat at the thermistor 14 thus dropping the temperature of the thermistor 14 and increasing the resistance through that thermistor 14. A corresponding increase in voltage is noted and the change in voltage indicates the velocity of the blood.

Prior to actually measuring the change in voltage in a blood vessel, the thermistors 14 are calibrated with flowing blood in a small tube where the velocity and the changes in voltage can readily be measured. The changes in voltage in the blood vessel can then be compared with the known changes, as calibrated, to determine blood flow velocity.

One method of calibrating the thermistors 14 is explained in copending application, Ser. No. 612,557, entitled Process of Forming an Electrical Cable for Chronic Implantation within a Living Body at page 7, lines 2–18. This discussion is incorporated by reference herein.

With current flowing through all three thermistors 14 and with the thermistors 14 extended into the blood flow, chilled saline in a predetermined amount is injected through means 30 into the catheter 12 and into the blood vessel. A portion of the chilled saline is forced out through holes 24 and facilitates complete mixing of the blood and the saline. Voltage responses are recorded with the largest response being recorded at the thermistor 14 closest to the catheter tip 41 and the smallest response recorded at the thermistor 14 farthest from the catheter tip 43 (See FIG. 7).

Figure 7:
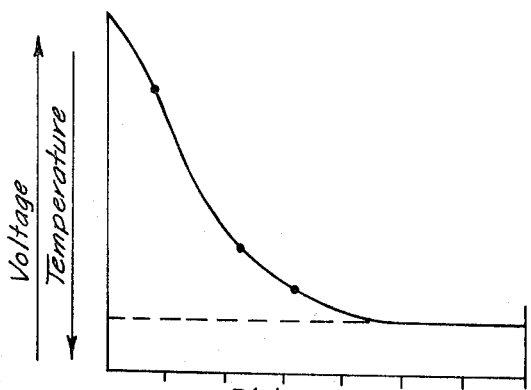
FIG. 7 is a generalized curve showing voltage response through the thermistors when chilled saline is introduced into the bloodstream through the catheter.

As with the velocity measurement, the thermistors 14 are calibrated and a generalized curve is formed prior to measurements in the body. FIG. 7 is a representation of the generalized curve wherein the abscissa is calibrated in terms of the distance the thermistors 14 are located from the catheter tip 43 and the ordinate is voltage response and temperature. With the generalized curve, the relationship between cross-sectional area of the blood vessel and amount of chilled saline is known. Complete mixing is indicated by the dashed line.

To determine cross-sectional area of the blood vessel, the amount of saline is increased or decreased until the voltage response fits the generalized curve. The amount of saline can then be multiplied by the known relationship to find the cross-sectional area of the blood vessel.

Restrictions and enlargements in the blood vessel can be determined by moving the thermistors 14 through a blood vessel. Changes in voltage response will indicate changes in cross-sectional area of the blood vessel and will indicate restrictions and/or enlargements of the vessel lumen.

The flowmeter 11, of this invention, has certain advantages over other types of flowmeters. The electrical response through this flowmeter 11 is an indication of instantaneous flow rates at the thermistors 14. There are no intervening tissue layers or averaging effects to mask or distort the flow signal. Simple circuitry is used herein and the flowmeter 11 is free of ECG. or magnetic field artifacts. By utilizing the insertable catheter 12, there is only a minimal chance of the flowmeter 11 breaking off while implanted in a blood vessel.

Although a preferred embodiment has been described hereinbefore, it is to be remembered that various modifications may be made without departing from the invention as defined in the appended claims.

I claim:

1. A device for use in measuring fluid flow comprising:
    a catheter having an insertable end and a measurement end, said catheter being elongate and flexible and having an opening therethrough;
    a pair of wires extending longitudinally through said catheter and movable longitudinally through said opening therein, each of said wires being electrically insulated and electrically conductive and having ends disposed proximate opposite ends of said catheter;
    a thermistor having an electrical resistance which is variable with slight variations in ambient temperature, said thermistor being electrically insulated, disposed near said insertable end of said catheter, and electrically connected between the ends of said wires;
    moving means connected to said wires for longitudinally moving said wires and said thermistor connected thereto into and out of said insertable end of said catheter;
    means for introducing a liquid through the opening in said catheter through which said wires move and out the insertable end of said catheter such that the liquid introduced may flow around and in contact with said thermistor; and
    connecting means for connecting said ends of said wires proximate said measurement end of said catheter to an instrument capable of measuring the electrical response through said thermistor.

2. The device of claim 1 adapted for measuring blood flow through blood vessels wherein a plurality of pairs of said wires extend through said catheter, each of said pairs of wires having a thermistor disposed near the insertable end of the catheter, and said thermistors being spaced apart longitudinally.

3. The device of claim 2 wherein at least three thermistors are disposed near said insertable end, said thermistors being spaced apart longitudinally.

4. The device of claim 3 wherein said means for introducing a liquid comprises:
    a fitting having a leg and two arms, all having interconnecting passageways formed therethrough;
    means on one of said arms for attaching the measurement end of said catheter;
    means on the second of said arms for attaching the means for longitudinally moving said wires in said catheter;
    means on said leg for introducing liquid through said catheter and into the blood vessel.

5. The device of claim 4 wherein said moving means comprises:
    a tubular element slidably inserted into said second arm and rigidly affixed to said wires; said tubular element having annular gradations formed therearound; and
    a handle member affixed to said tubular element and having said wires running therethrough.

6. The device of claim 5 wherein centering means comprising a plurality of flexible loops disposed about the catheter are formed on the insertable end of said catheter to center said catheter laterally in the blood vessel.

7. The device of claim 6 wherein a plurality of holes are formed through said catheter proximate said insertable end.

8. The device of claim 7 wherein said insertable end of said catheter and said insulation for said wires and said thermistors are manufactured from a material innocuous to mammalian tissue.

9. The device of claim 8 wherein said wires are formed from platinum alloy and have an outside diameter of about 0.0025 inches.

10. The device of claim 9 wherein the time constant of said thermistors is more than 100 Hz.

* * * * *